United States Patent
Son et al.

(10) Patent No.: US 9,433,965 B2
(45) Date of Patent: Sep. 6, 2016

(54) SEALANT FORMING APPARATUS, SEALANT FORMING METHOD, AND METHOD OF MANUFACTURING LIQUID CRYSTAL DISPLAY DEVICE USING THE SAME

(75) Inventors: Hae Joon Son, Paju-si (KR); In Kyu Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 1104 days.

(21) Appl. No.: 12/793,166

(22) Filed: Jun. 3, 2010

(65) Prior Publication Data
US 2010/0243157 A1 Sep. 30, 2010

Related U.S. Application Data

(62) Division of application No. 11/478,346, filed on Jun. 30, 2006, now Pat. No. 7,748,342.

(30) Foreign Application Priority Data

Dec. 29, 2005 (KR) .......................... 10-2005-133925

(51) Int. Cl.
*B05C 11/10* (2006.01)
*B05C 5/02* (2006.01)
*G02F 1/1339* (2006.01)

(52) U.S. Cl.
CPC .............. *B05C 11/1002* (2013.01); *B05C 5/02* (2013.01); *G02F 1/1339* (2013.01)

(58) Field of Classification Search
CPC ........... B05C 11/1005; B05C 11/1007; B05C 11/101; B05C 11/1013; B05C 11/1002; G02C 5/02
See application file for complete search history.

(56) References Cited

U.S. PATENT DOCUMENTS

| | | | | |
|---|---|---|---|---|
| 3,916,043 A | * | 10/1975 | Fowble | 427/294 |
| 5,277,333 A | * | 1/1994 | Shimano | 222/14 |
| 5,425,716 A | * | 6/1995 | Kawasaki et al. | 604/152 |
| 5,881,914 A | * | 3/1999 | Tsuda et al. | 222/54 |
| 2002/0013109 A1 | * | 1/2002 | Nissing | 442/153 |
| 2003/0125618 A1 | * | 7/2003 | Houde | 600/431 |
| 2004/0105065 A1 | * | 6/2004 | Jung et al. | 349/153 |
| 2005/0223917 A1 | * | 10/2005 | Bang et al. | 101/123 |
| 2005/0271806 A1 | * | 12/2005 | Ganzer et al. | 427/207.1 |
| 2008/0002137 A1 | * | 1/2008 | Kim | G02F 1/1341 349/187 |

FOREIGN PATENT DOCUMENTS

| | | |
|---|---|---|
| JP | 63-013278 | 1/1988 |
| JP | 02-122858 | 5/1990 |
| JP | 02-184370 | 7/1990 |

(Continued)

*Primary Examiner* — Francisco Tschen
(74) *Attorney, Agent, or Firm* — Dentons US LLP

(57) ABSTRACT

A sealant forming device, a sealant forming method and a method for manufacturing a liquid crystal display device using the same are disclosed. According to the present invention, a sealant coagulated in a nozzle can be minimized or prevented by performing an instantaneous suction process. A sealant forming device includes a dispenser including a syringe, and a nozzle connected to a lower end of the syringe to discharge a sealant therethrough; a dispensing tube connected to the syringe to apply a pressure to the syringe; and an instantaneous suction tube connected to the syringe to extract the sealant remaining in the nozzle after discharging the sealant.

27 Claims, 3 Drawing Sheets

(56) References Cited

FOREIGN PATENT DOCUMENTS

| JP | 04-305265 | 10/1992 |
| JP | 08-206564 | 8/1996 |
| JP | 10-128208 | 5/1998 |
| JP | 11-156267 | 6/1999 |
| JP | 11-207228 | 8/1999 |
| JP | 2003-154301 | 5/2003 |
| JP | 2005-055454 | 3/2005 |

* cited by examiner

SEALANT FORMING APPARATUS, SEALANT FORMING METHOD, AND METHOD OF MANUFACTURING LIQUID CRYSTAL DISPLAY DEVICE USING THE SAME

This application is a divisional application of U.S. patent application Ser. No. 11/478,346, filed on Jun. 30, 2006 now U.S. Pat. No. 7,748,342, which claims the benefit of the Korean Patent Application No. P2005-133925, filed on Dec. 29, 2005, all of which are hereby incorporated by reference as if fully set forth herein. This application incorporates by reference application Ser. No. 10/184,096, filed on Jun. 28, 2002, entitled "SYSTEM AND METHOD FOR MANUFACTURING LIQUID CRYSTAL DISPLAY DEVICES FROM LARGE MOTHER SUBSTRATE PANELS"; and application Ser. No. 11/476,919, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to a sealant dispensing method of a liquid crystal display (LCD) device, and more particularly, to a sealant dispensing method using a dispenser.

2. Discussion of the Related Art

Among various ultra-thin flat type display devices, which include a display screen having a thickness of several centimeters, a liquid crystal display (LCD) device can be widely used for notebook computers, monitors, aircraft, and etc. because it has advantages such as low power consumption and portability.

FIG. 1 is a cross sectional view of an LCD device according to the related art. As shown in FIG. 1, the LCD device according to the related art includes lower and upper substrates 1 and 3 facing each other at a predetermined interval therebetween, and a liquid crystal layer 5 formed between the lower and upper substrates 1 and 3.

Although not shown, the lower substrate 1 includes a thin film transistor TFT and a pixel electrode, and the upper substrate 3 includes a black matrix layer, a color filter layer and a common electrode.

In addition, a sealant 7 is provided between the lower and upper substrates 1 and 3 to prevent liquid crystal from leaking and bond the lower and upper substrates 1 and 3 to each other.

The sealant 7 is dispensed on any one of the lower and upper substrates 1 and 3 by either a printing method using a screen or a dispensing method using a dispenser. The printing method may have bad effects on an alignment layer formed on the substrate, because the screen contacts the substrate during the printing process. Recently, the dispensing method is generally used.

Hereinafter, a dispensing method according to the related art will be explained with reference to the accompanying drawings. FIG. 2 is a schematic view illustrating a sealant forming method using a dispenser according to the related art.

The dispenser is provided with a syringe 10, a nozzle 20, and a dispensing tube 30. The syringe 10 has a sealant 15 therein. The nozzle 20 is connected to a lower end of the syringe 10 to supply the sealant 15 to a substrate 1. The dispensing tube 30 is connected to an upper end of the syringe 10 to discharge the sealant 15 through the nozzle 20 by applying a pressure to the syringe 10.

A sealant forming method using the above dispenser will now be explained.

The dispenser moves along an arrow direction from a starting point(s) of the substrate 1, and then turns back to the starting point(s) of the substrate 1. During the movement of the dispenser, a predetermined pressure is applied to the syringe 10 through the dispensing tube 30 so that the sealant 15 is discharged to the substrate 1 through the nozzle 20. Accordingly, the sealant 15 is dispensed to the substrate 1.

After completion of dispensing the sealant 15, the dispensing tube 30 is closed to stop the discharge of the sealant 15. Thereafter, the dispenser is moved to a predetermined position and dispenses another sealant material according to the above-mentioned method to form a plurality of sealant patterns on the substrate 1.

However, the dispenser and sealant dispensing method according to the related art has the following disadvantages.

After completion of dispensing one sealant material, the dispensing tube 30 is closed to stop the discharge of the sealant 15 from the nozzle 20. At this time, the sealant may coagulate in the nozzle 20. Thereafter, when another sealant material is supplied to the substrate 1 through the nozzle 20, the coagulated sealant is discharged to the starting point of the substrate 1, thereby making it difficult to uniformly dispense sealant materials. Because of this problem, it has been necessary to start dispensing the sealant in a dummy region away from the panel area. This way any dried or coagulated sealant is dispensed away from the panel's sealant area. Sealant dispensing patterns include ribbon patterns or other starting paths in the dummy region. The problem with these solutions is that they require the dispensing of sealant across the scribing or cutting path on the substrate. Scribing or cutting through the hardened sealant can damage or wear out the scribing or cutting tool.

SUMMARY OF THE INVENTION

Accordingly, the present invention is directed to a sealant dispensing apparatus and dispensing method, which substantially obviates one or more problems due to limitations and disadvantages of the related art.

An advantage of the present invention is to provide a sealant forming apparatus and method that can prevent a sealant from coagulating in a nozzle.

Another advantage of the present invention is to provide a method for manufacturing an LCD device in which a sealant can be uniformly dispensed in the LCD device.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a sealant forming apparatus includes a dispenser including a syringe, and a nozzle connected to a lower end of the syringe to discharge a sealant therethrough; a dispensing tube connected to the syringe to apply a pressure to the syringe; and an instantaneous suction tube connected to the syringe to extract the sealant remaining in the nozzle after discharging the sealant.

That is, a process for extracting the sealant remaining in the nozzle is additionally performed after dispensing the sealant, so that it is possible to minimize or prevent the sealant from coagulating in the nozzle.

The sealant dispensing apparatus includes an atmospheric tube connected to the syringe to apply an atmospheric pressure to the dispenser between discharging the sealant and extracting the sealant.

The sealant forming device includes an additional suction tube connected to the syringe to prevent the sealant from moving down to the nozzle after extracting the sealant.

The dispensing tube includes a dispensing valve for controlling the turn-on/off state of the dispensing tube and a dispensing regulator for controlling the pressure applied to the syringe, and the instantaneous suction tube includes an instantaneous suction valve for controlling the turn-on/off state of the instantaneous suction tube and an instantaneous suction regulator for controlling the vacuum applied to the syringe.

The atmospheric tube includes an atmospheric valve for controlling the turn-on/off state of the atmospheric tube.

The additional suction tube includes an additional suction valve for controlling the turn-on/off state of the additional suction tube and an additional suction regulator for controlling the vacuum applied to the syringe.

In another aspect of the present invention, a sealant forming method includes discharging a sealant through a nozzle of a dispenser to dispense the sealant on a substrate; and extracting at least a portion of the sealant remaining in the nozzle after dispensing the sealant by using a vacuum pressure.

The sealant forming method further includes restoring an atmospheric pressure to the dispenser between discharging the sealant and extracting the sealant.

The sealant forming method further includes performing an additional suction process to prevent at least another portion of the sealant from moving down to an end of the nozzle after extracting the sealant.

The sealant forming method further includes measuring an amount of the sealant in the syringe to determine a level of pressure or vacuum applied to the syringe.

In another aspect of the present invention, a method for manufacturing an LCD device includes preparing first and second substrates; dispensing a sealant on at least one of the first and second substrates, wherein dispensing the sealant includes: discharging the sealant through a nozzle of a dispenser to dispense the sealant on the substrate; restoring an atmospheric pressure to the dispenser after dispensing the sealant; extracting at least a portion of the sealant remaining in the nozzle after applying the atmospheric pressure; performing an additional suction process to prevent at least another portion of the sealant from moving down to an end of the nozzle after extracting the sealant; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, a sealant forming device, a sealant forming method and a method of manufacturing an LCD device using the sealant forming device according to the present invention will be explained with reference to the accompanying drawings.

Figure 1:
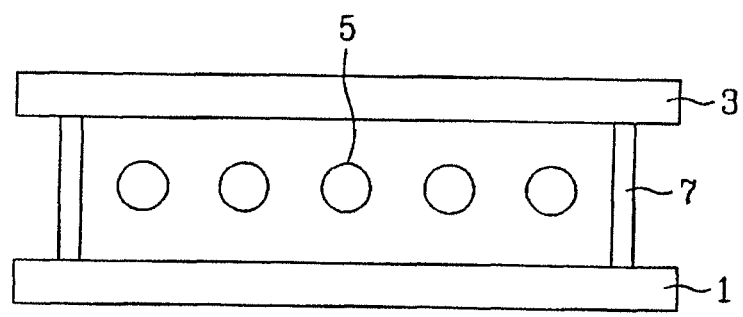
FIG. 1 is a cross sectional view of an LCD device according to the related art.
Figure 2:
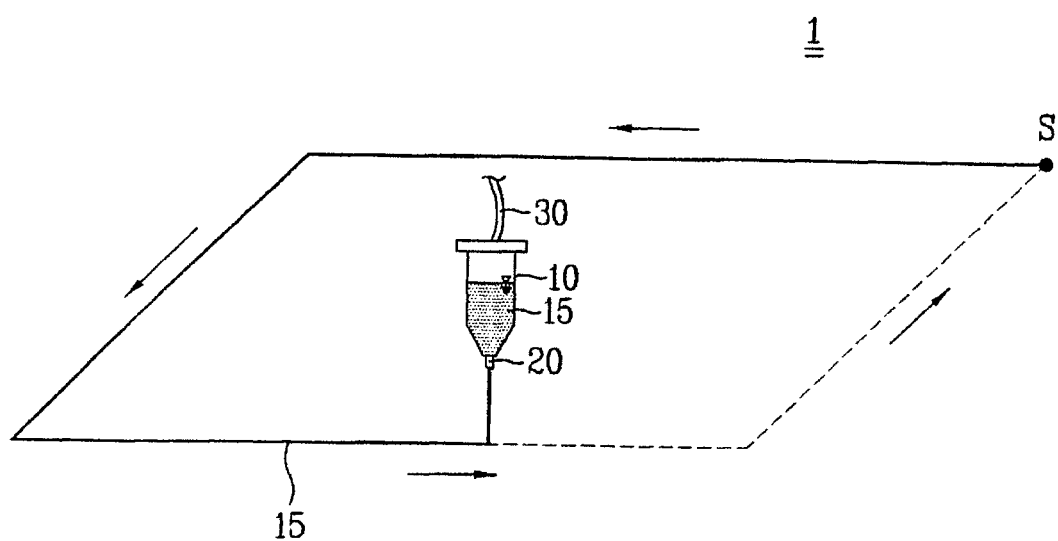
FIG. 2 is a schematic view illustrating a sealant forming method using a dispenser according to the related art.
Figure 3:
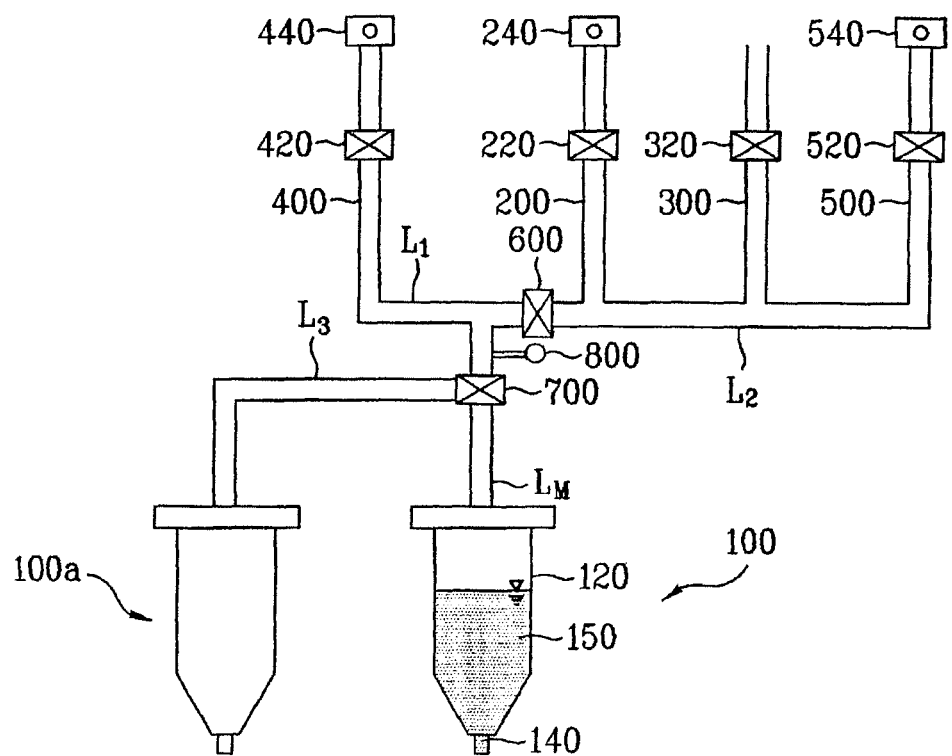
FIG. 3 is a schematic view illustrating a sealant forming device according to an embodiment of the present invention.

First, a sealant forming device according to the present invention will now be explained. FIG. 3 is a schematic view illustrating a sealant dispensing apparatus according to an embodiment of the present invention.

Referring to FIG. 3, the sealant forming device is provided with a dispenser 100, a dispensing tube 200, an atmospheric tube 300, an instantaneous suction tube 400 and an additional suction tube 500. The dispenser 100 includes a syringe 120 and a nozzle 140 connected to a lower end of the syringe 120 to discharge a sealant 150.

The dispensing tube 200 applies a pressure to the syringe 120 of the dispenser 100 to discharge the sealant 150 through the nozzle 140. The dispensing tube 200 is connected to the syringe 120 of the dispenser 100. Specifically, the dispensing tube 200 is connected to a second tube ($L_2$) diverged from a main tube ($L_M$) which is connected to the syringe 120. The dispensing tube 200 is provided with a dispensing valve 220 for switching the dispensing tube 200 and a dispensing regulator 240 for controlling the pressure applied to the syringe 120.

The atmospheric tube 300 applies an atmospheric pressure to the dispenser 100 after discharging the sealant 150, and then the instantaneous suction tube 400 extracts the remaining sealant 150. When the instantaneous suction tube 400 draws the remaining sealant 150 out right after discharging the sealant 150, it is difficult to extract all the remaining sealant 150 due to the pressure applied through the dispensing tube 200. Accordingly, the atmospheric pressure is applied to the dispenser 100 to change the pressure of the dispenser 100 before extracting the remaining sealant.

The atmospheric tube 300 is connected to the syringe 120 of the dispenser 100. Specifically, the atmospheric tube 300 is connected to the second tube ($L_2$) diverged from the main tube ($L_M$) which is connected to the syringe 120. The atmospheric tube 300 is provided with an atmospheric valve 320 for switching the atmospheric tube 300. In this case, an end of the atmospheric tube 300 is open to the external air so that the atmospheric tube 300 does not require a regulator.

The instantaneous suction tube 400 extracts the sealant 150 remaining in the nozzle 140 right after the atmospheric pressure is applied to the dispenser 100 to prevent the sealant 150 from coagulating in the nozzle 140.

The instantaneous suction tube 400 is connected to the syringe 120 of the dispenser 100. Specifically, the instantaneous suction tube 400 is connected to a first tube ($L_1$) diverged from the main tube ($L_M$) which is connected to the syringe 120. The instantaneous suction tube 400 is provided with an instantaneous suction valve 420 for switching the instantaneous suction tube 400 and an instantaneous suction regulator 440 for controlling the vacuum state applied to the syringe 120.

The additional suction tube 500 prevents the sealant 150 from being moved to the end of the nozzle 140 after extracting the sealant using the instantaneous suction tube 400. After extracting the sealant 150 using the instantaneous suction tube 400, the instantaneous suction valve 420 is switched to an off-state in which the sealant 150 may move down and coagulate in the nozzle 140. To prevent the sealant 150 from moving down and coagulating in the nozzle 140, the sealant forming device includes the additional suction tube 500 to make the syringe 120 in a vacuum state.

The additional suction tube 500 is connected to the syringe 120 of the dispenser 100. Specifically, the additional suction tube 500 is connected to the second tube ($L_2$) diverged from the main tube ($L_M$) which is connected to the syringe 120. The additional suction tube 500 is provided with an additional suction valve 520 for switching the additional suction tube 500 and an additional suction regulator 540 for controlling the vacuum state applied to the syringe 120.

The main tube also known as a central tube ($L_M$) is connected to the syringe 120 of the dispenser 100, and the first ($L_1$) and second ($L_2$) tubes are diverged from the main tube ($L_M$). The first tube ($L_1$) is connected to the instantaneous suction tube 400. The second tube ($L_2$) is connected to the dispensing tube 200, the atmospheric tube 300 and the additional suction tube 500.

The second tube ($L_2$) is provided with a protection valve 600. When the instantaneous suction tube 400 is in the on-state for instantaneously extracting the sealant 150 remaining in the nozzle 140, the dispensing tube 200, the atmospheric tube 300 and the additional suction tube 500 are in the off-state. During the extraction of the sealant 150, the sealant 150 may be moved to the second tube ($L_2$) instead of the instantaneous suction tube 400. In this respect, the protection valve 600 is provided to prevent the flow of the sealant 150 toward the second tube ($L_2$).

The main tube ($L_M$) includes a pressure sensor 800 which senses the pressure inside the dispenser 100, and measures the amount of sealant 150 included in the dispenser 100 to determine the level of pressure or vacuum in the dispensing tube 200, the atmospheric tube 300, the instantaneous suction tube 400, and the additional suction tube 500.

The main tube ($L_M$) is connected to a third tube ($L_3$), and the third tube ($L_3$) is connected to an empty syringe 100a. The main tube ($L_M$) also includes a selection valve 700 for controlling the turn-on/off state of the main tube ($L_M$) and the third tube ($L_3$).

In operating the sealant dispensing device, it is beneficial to determine the degree of pressure applied to the dispensing tube 200 and the degree of vacuum applied to the instantaneous suction tube 400 before dispensing. The degrees of pressure and vacuum are determined based on the amount of the sealant 150 provided in the syringe 120. Accordingly, the empty syringe 100a, the third tube ($L_3$), the selection valve 700 and the pressure sensor 800 are used to determine the amount of the sealant 150.

To determine the precise amount of the sealant 150, the selection valve 700 is first controlled such that the third tube ($L_3$) becomes off-state and the main tube ($L_M$) becomes on-state. Then, a pressure is applied to the syringe 100 and the pressure sensor 800 measures the pressure of the syringe 100. The selection valve 700 is then controlled to make the third tube ($L_3$) on-state and the main tube ($L_M$) off-state. Then, after applying the pressure to the empty syringe 100a, the pressure sensor 800 measures the pressure of the empty syringe 100a. By comparing the pressure difference between the syringe 100 and the empty syringe 100a, it is possible to measure the amount of the sealant 150 in the syringe 100.

Figure 4:
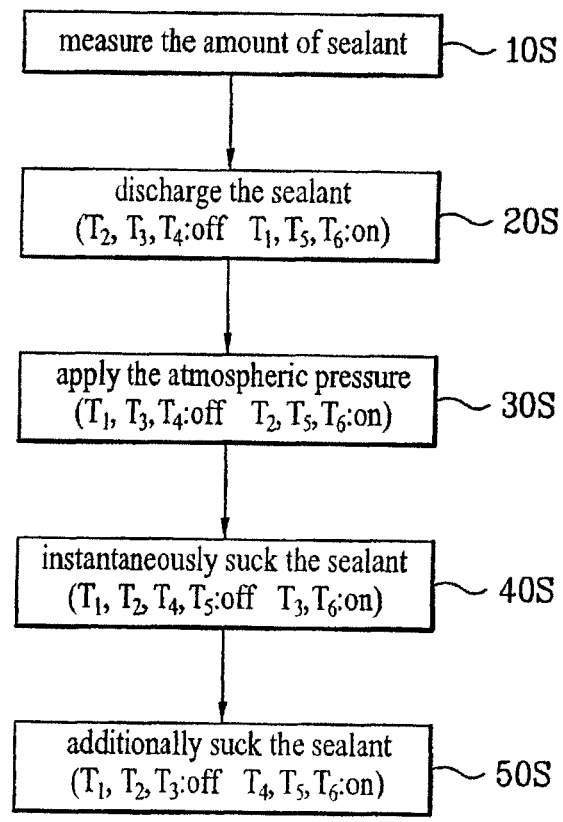
FIG. 4 is a flow chart of a sealant forming process according to an embodiment of the present invention.

Hereinafter, a method for forming a sealant according to the present invention will be explained with reference to FIG. 4. FIG. 4 is a flow chart of a sealant forming process according to an embodiment of the present invention.

First, an amount of the sealant 150 in the syringe 100 is measured (10S) for initially setting the sealant forming device. To measure the amount of the sealant 150, a pressure is applied to the syringe 100 and the empty syringe 100a using the selection valve 700, and then the pressure difference between the syringe 100 and the empty syringe 100a is measured using the selection valve 700 and the pressure sensor 800 as described above.

Next, the sealant 150 is discharged from the nozzle 140 of the dispenser 100 and dispensed on a substrate (20S). To discharge the sealant 150, the atmospheric valve 320 of the atmospheric tube 300, the instantaneous suction valve 420 of the instantaneous suction tube 400 and the additional suction valve 520 of the additional suction tube 500 are in the off-state, and a pressure is applied to the sealant 150 by using the dispensing regulator 240 of the dispensing tube 200. At this time, the protection valve 600 of the second tube ($L_2$) is in the on-state and the selection valve 700 of the main tube ($L_M$) is in the on-state. To form a seal pattern on the substrate, at least one of the dispenser 100 or the substrate can be moved.

After completion of the sealant forming process, the sealant forming device may be moved to a predetermined position or standby position until another substrate is loaded to perform another sealant forming process. In the mean time, the following processes are conducted to prevent the sealant 150 from coagulating in the nozzle 120 of the dispenser 100.

After dispensing the sealant 150, the atmospheric pressure is applied to the dispenser 100 (30S) to decrease the pressure difference, thereby improving the efficiency in the instantaneous suction process.

In the process of applying the atmospheric pressure to the dispenser 100, the dispensing valve 220 of the dispensing tube 200, the instantaneous suction valve 420 of the instantaneous suction tube 400 and the additional suction valve 520 of the additional suction tube 500 are in the off-state, and the atmospheric valve 320 of the atmospheric tube 300 is in the on-state. At this time, the protection valve 600 of the second tube ($L_2$) is in the on-state, and the selection valve 700 of the main tube ($L_M$) is in the on-state.

Next, after applying the atmospheric pressure to the dispenser 100, the sealant 150 remaining in the nozzle 140 of the dispenser 100 is substantially instantaneously extracted (40S). To extract the sealant 150 remaining in the nozzle 140, the dispensing valve 220 of the dispensing tube 200, the atmospheric valve 320 of the atmospheric tube 300 and the additional suction valve 520 of the additional suction tube 500 are in the off-state, and the instantaneous suction valve 420 of the instantaneous suction tube 400 is in the on-state. Thereafter, a vacuum pressure is applied and maintained by the instantaneous suction regulator 440 of the instantaneous suction tube 400. At this time, the protection valve 600 of the second tube ($L_2$) is in the off-state, and the selection valve 700 of the main tube ($L_M$) is in the on-state.

Because of the vacuum pressure, the sealant 150 remaining in the nozzle 140 moves up through the instantaneous suction tube 400. This instantaneous suction process is performed to prevent the sealant 150 from coagulating in the nozzle 140.

After the instantaneous suction process, an additional suction process is performed to prevent the sealant 150 from moving down to the nozzle 140 of the dispenser 100 (50S).

In the additional suction process of the dispenser 100, the dispensing valve 220 of the dispensing tube 200, the atmospheric valve 320 of the atmospheric tube 300 and the instantaneous suction valve 420 of the instantaneous suction tube 400 are in the off-state, and the additional suction valve 520 of the additional suction tube 500 is in the on-state. In this state, a vacuum pressure is applied by the additional suction regulator 540 of the additional suction tube 500. At this time, the protection valve 600 of the second tube ($L_2$) is in the on-state, and the selection valve 700 of the main tube (LM) is in the on-state.

As described above, a method for forming a sealant according to the present invention can easily control the pressures of the sealant forming device and prevent or minimize a blur problem caused by the coagulated sealant. Also, a linear seal pattern may be formed along a shape of pads (for example, an LCD type having four pads) depending a type of LCD devices.

Hereinafter, a method for manufacturing an LCD device using the sealant forming device according to the present invention will now be described.

First, lower and upper substrates are prepared.

Elements provided on the lower and upper substrates can be changed according to a driving mode of the LCD device. That is, for the TN mode LCD device, the lower substrate includes gate and data lines, a thin film transistor TFT and a pixel electrode, and the upper substrate includes a black matrix layer, a color filter layer and a common electrode. The gate and data lines cross each other to thereby define a pixel region. The thin film transistor TFT is formed adjacent to a crossing of the gate and data lines, wherein the thin film transistor serves as a switching element. The pixel electrode is formed in the pixel region to generate an electric field. Then, the black matrix layer prevents light leakage, and the color filter layer is provided for displaying various colors. Also, the common electrode generates the electric field in conjunction with the pixel electrode.

For the IPS mode LCD device, the lower substrate includes gate and data lines, a thin film transistor, a pixel electrode and a common electrode, and the upper substrate includes a black matrix layer and a color filter layer. The gate and data lines cross each other to thereby define a pixel region. The thin film transistor TFT is formed adjacent to a crossing of the gate and data lines, wherein the thin film transistor serves as a switching element. The pixel and common electrodes are formed in parallel in the pixel region, wherein the pixel and common electrodes generate a parallel electric field. Then, the black matrix layer prevents light leakage, and the color filter layer is provided for displaying various colors.

Thereafter, a sealant is dispensed on at least one of the lower and upper substrates. The sealant is dispensed according to the above-mentioned method. The sealant may be formed in a pattern having an injection hole, or in a pattern having no injection hole, depending on a method of forming a liquid crystal layer.

After that, a liquid crystal layer is formed between the lower and upper substrates. The liquid crystal layer may be formed by a vacuum injection method or a dispensing method. In the vacuum injection method, the sealant is dispensed in the pattern having an injection hole, and the lower and upper substrates are bonded to each other. Then, liquid crystal is injected to a space between the lower and upper substrates through the injection hole of the sealant. In the dispensing method, the sealant is dispensed in the pattern having no injection hole, and liquid crystal is dispensed on any one of the lower and upper substrates. Then, the lower and upper substrates are bonded to each other.

As described above, the sealant forming device, the sealant forming method and the method of manufacturing an LCD device using the sealant forming device according to the present invention have the following advantages.

A process for substantially instantaneously extracting the sealant remaining in the nozzle is additionally performed after dispensing the sealant on the substrate so that it is possible to minimize or prevent the sealant from coagulating in the nozzle.

Also, a method for forming a sealant according to the present invention can easily control the pressures of the sealant forming device and prevent or minimize a blur problem caused by the coagulated sealant. Accordingly, a linear seal pattern may be formed along a shape of pads (for example, an LCD type having four pads) depending a type of LCD devices. The present invention allows seal patterns to be formed entirely outside of the dummy region and away from the scribing or cutting paths on the substrate, thus preventing excessive wear of the scribing or cutting tools caused by scribing or cutting through hardened sealant.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A sealant forming method comprising the following sequence:
    (1) discharging a sealant through a nozzle of a dispenser to dispense the sealant on a substrate, wherein the dispenser includes a syringe, and a nozzle connected to a lower end of the syringe to discharge a sealant, wherein the syringe is connected to a central tube and, first and second tubes are diverged from the central tube in different directions;
    (2) restoring an atmospheric pressure to the dispenser through an atmospheric tube;
    (3) extracting at least a portion of the sealant remaining in the nozzle through an instantaneous suction tube connected to the syringe by applying a vacuum pressure; and
    (4) performing an additional suction process to prevent at least another portion of the sealant from moving down to an end of the nozzle through an additional suction tube connected to the syringe,
    wherein the instantaneous suction tube is connected to the first tube and, the atmospheric tube, a dispensing tube and the additional suction tube are connected to the second tube;
    wherein the central tube includes an element for measuring an amount of the sealant included in the syringe to determine a level of pressure of vacuum applied to the syringe and wherein the element includes a pressure sensor connected to the central tube, a third tube diverged from the central tube, an empty syringe connected to the third tube, and a selection valve to control the turn-on/off state of the central tube and the third tube;

wherein the dispensing tube, the atmospheric tube, the instantaneous suction tube and the additional suction tube have a dispensing valve, an atmospheric valve, an instantaneous suction valve and an additional suction valve therein, respectively; and wherein extracting at least a portion of the sealant remaining in the nozzle includes:

switching off the dispensing valve, the atmospheric valve and the additional suction valve; and switching on the instantaneous suction valve.

2. A sealant forming method comprising the following sequence:
(1) discharging a sealant through a nozzle of a dispenser having a syringe to dispense the sealant on a substrate, wherein the dispenser includes a syringe, and a nozzle connected to a lower end of the syringe to discharge a sealant, wherein the syringe is connected to a central tube and, first and second tubes are diverged from the central tube in different directions;
(2) restoring an atmospheric pressure through an atmospheric tube to the dispenser;
(3) extracting at least a portion of the sealant remaining in the nozzle through an instantaneous suction tube connected to the syringe;
(4) performing an additional suction process to prevent at least another portion of the sealant from moving down to an end of the nozzle through an additional suction tube connected to the syringe; and
(5) measuring an amount of the sealant in the syringe to determine a level of pressure applied to the syringe,
wherein the instantaneous suction tube is connected to the first tube and, the atmospheric tube, a dispensing tube and the additional suction tube are connected to the second tube;
wherein the central tube includes an element for measuring an amount of the sealant included in the syringe to determine a level of pressure of vacuum applied to the syringe and wherein the element includes a pressure sensor connected to the central tube, a third tube diverged from the central tube, an empty syringe connected to the third tube, and a selection valve to control the turn-on/off state of the central tube and the third tube;
wherein the dispensing tube, the atmospheric tube, the instantaneous suction tube and the additional suction tube have a dispensing valve, an atmospheric valve, an instantaneous suction valve and an additional suction valve therein, respectively; and
wherein extracting at least a portion of the sealant remaining in the nozzle includes:

switching off the dispensing valve, the atmospheric valve and the additional suction valve; and switching on the instantaneous suction valve.

3. The sealant forming method of claim 2, wherein discharging the sealant through the nozzle of the dispenser includes:
switching off the atmospheric valve, the instantaneous suction valve and the additional suction valve; and
switching on the dispensing valve.

4. The sealant forming method of claim 2, wherein discharging the sealant through the nozzle of the dispenser includes applying a pressure to the dispenser by a dispensing regulator in the dispensing tube connected to the syringe.

5. The sealant forming method of claim 2, wherein restoring an atmospheric pressure to the dispenser includes:
switching off the dispensing valve, the instantaneous suction valve and the additional suction valve; and
switching on the atmospheric valve.

6. The sealant forming method of claim 2, wherein extracting at least a portion of the sealant remaining in the nozzle further includes switching off a protection valve in a second tube connected to the dispensing, atmospheric and additional suction tubes.

7. The sealant forming method of claim 2, wherein extracting at least a portion of the sealant remaining in the nozzle includes applying a vacuum pressure to the dispenser by a substantially instantaneous suction regulator in an instantaneous suction tube connected to the syringe.

8. The sealant forming method of claim 2, wherein performing the additional suction process to the dispenser includes:
switching off the dispensing valve, the atmospheric valve and the instantaneous suction valve; and
switching on the additional suction valve.

9. The sealant forming method of claim 2, wherein performing the additional suction process to the dispenser comprises applying a vacuum pressure to the dispenser by an additional suction regulator in an additional suction tube connected to the syringe.

10. The sealant forming method of claim 2, wherein measuring the amount of the sealant in the syringe includes:
applying a pressure to the syringe;
applying a pressure to the empty syringe; and
comparing the pressure applied to the syringe with the pressure applied to the empty syringe.

11. The sealant forming method of claim 2, wherein discharging the sealant through the nozzle of the dispenser includes dispensing the sealant on the substrate by moving the dispenser on the fixed substrate.

12. The sealant forming method of claim 2, wherein discharging the sealant through the nozzle of the dispenser includes dispensing the sealant on the substrate by moving the substrate with the fixed dispenser.

13. The sealant forming method of claim 2, wherein the sealant is formed in a linear pattern.

14. A method for manufacturing an LCD device comprising:
preparing first and second substrates;
dispensing a sealant on at least one of the first and second substrates, wherein dispensing the sealant includes the following sequence:
(1) discharging the sealant through a nozzle of a dispenser to dispense the sealant on the substrate, wherein the dispenser includes a syringe, and a nozzle connected to a lower end of the syringe to discharge a sealant, wherein the syringe is connected to a central tube and, first and second tubes are diverged from the central tube in different directions;
(2) restoring an atmospheric pressure through an atmospheric tube to the dispenser;
(3) extracting at least a portion of the sealant remaining in the nozzle through an instantaneous suction tube;
(4) performing an additional suction process to prevent at least another portion of the sealant from moving down to an end of the nozzle through an additional suction tube connected to the syringe, wherein a dispensing tube, the instantaneous suction tube and the additional suction tube are connected to a central tube which is then connected to the syringe;
(5) measuring an amount of the sealant in the syringe to determine a level of pressure applied to the syringe; and
providing a liquid crystal layer to at least one of the first and second substrates, wherein the instantaneous suction tube is connected to the first tube and, the dispensing tube, the atmospheric tube and the additional suction tube are connected to the second tube and have a dispensing valve, an atmospheric valve, an instantaneous suction valve and an additional suction valve therein, respectively;

wherein the central tube includes an element for measuring an amount of the sealant included in the syringe to determine a level of pressure of vacuum applied to the syringe and wherein the element includes a pressure sensor connected to the central tube, a third tube diverged from the central tube, an empty syringe connected to the third tube, and a selection valve to control the turn-on/off state of the central tube and the third tube; and wherein extracting at least a portion of the sealant remaining in the nozzle includes:

switching off the dispensing valve, the atmospheric valve and the additional suction valve; and switching on the instantaneous suction valve.

15. The method of claim 14, wherein the sealant has an injection hole formed therein and providing the liquid crystal layer includes bonding the first and second substrates and injecting a liquid crystal through the injection hole.

16. The method of claim 14, wherein providing the liquid crystal layer includes dispensing liquid crystal on at least one of the first and second substrates.

17. The method of claim 14, wherein discharging the sealant through the nozzle of the dispenser includes:

switching off the atmospheric valve, the instantaneous suction valve and the additional suction valve; and switching on the dispensing valve.

18. The method of claim 14, wherein discharging the sealant through the nozzle of the dispenser includes applying a pressure to the dispenser by a dispensing regulator in the dispensing tube connected to the syringe.

19. The method of claim 14, wherein restoring the atmospheric pressure to the dispenser includes:

switching off the dispensing valve, the instantaneous suction valve and the additional suction valve; and switching on the atmospheric valve.

20. The method of claim 14, wherein extracting at least a portion of the sealant remaining in the nozzle includes switching off a protection valve provided in a second tube connected to the dispensing, atmospheric and additional suction tubes.

21. The method of claim 14, wherein extracting at least a portion of the sealant remaining in the nozzle includes applying a vacuum pressure to the dispenser by an instantaneous suction regulator in an instantaneous suction tube connected to the syringe.

22. The method of claim 14, wherein performing the additional suction process to the dispenser includes:

switching off the dispensing valve, the atmospheric valve and the instantaneous suction valve; and switching on the additional suction valve.

23. The method of claim 14, wherein performing the additional suction process to the dispenser includes applying a vacuum pressure to the dispenser by an additional suction regulator in an additional suction tube connected to the syringe.

24. The method of claim 14, wherein measuring the amount of the sealant in the syringe includes:

applying a pressure to the syringe;

applying a pressure to the empty syringe; and comparing the pressure applied to the syringe with the pressure applied to the empty syringe.

25. The method of claim 14, wherein discharging the sealant through the nozzle of the dispenser includes dispensing the sealant on the substrate by moving the dispenser over the fixed substrate.

26. The method of claim 14, wherein discharging the sealant through the nozzle of the dispenser includes dispensing the sealant on the substrate by moving the substrate with the fixed dispenser.

27. The method of claim 14, wherein the sealant is formed in a linear pattern.

\* \* \* \* \*